United States Patent [19]

Gresch

[11] Patent Number: 5,202,142
[45] Date of Patent: Apr. 13, 1993

[54] PROCESS FOR THE PRODUCTION OF CLOUDY JUICE WHICH IS CLOUDING-STABLE

[75] Inventor: Walter Gresch, Niederweningen, Switzerland

[73] Assignee: Bucher-Guyer AG, Niederweningen, Switzerland

[21] Appl. No.: 778,946
[22] PCT Filed: Apr. 15, 1991
[86] PCT No.: PCT/CH91/00087
 § 371 Date: Feb. 13, 1992
 § 102(e) Date: Feb. 13, 1992
[87] PCT Pub. No.: WO91/15968
 PCT Pub. Date: Oct. 31, 1991

[30] Foreign Application Priority Data

Apr. 17, 1990 [CH] Switzerland ............ 292/90

[51] Int. Cl.$^5$ ............................... A23L 2/06
[52] U.S. Cl. ....................... 426/330.3; 426/599
[58] Field of Search ..................... 426/599, 330.3

[56] References Cited

U.S. PATENT DOCUMENTS

| 3,634,128 | 1/1972 | Bolin | 426/599 |
|---|---|---|---|
| 3,917,867 | 11/1975 | Atkins | 426/599 |
| 4,374,865 | 2/1983 | Strobel | 426/599 |
| 4,643,902 | 2/1987 | Lawhon | 426/599 |
| 4,889,574 | 12/1989 | Grant | 426/599 |
| 4,889,739 | 12/1989 | Powers | 426/599 |
| 4,946,702 | 8/1990 | Stipp | 426/599 |
| 4,959,237 | 9/1990 | Walker | 426/599 |
| 5,073,397 | 12/1991 | Tarr | 426/599 |
| 5,108,774 | 4/1992 | Mills | 426/599 |

FOREIGN PATENT DOCUMENTS

| 0137671 | 8/1984 | European Pat. Off. | 426/599 |
|---|---|---|---|
| 0174594 | 3/1986 | European Pat. Off. | 426/599 |
| 0292048 | 11/1988 | European Pat. Off. | 426/599 |
| 0337526 | 10/1989 | European Pat. Off. | 426/599 |

OTHER PUBLICATIONS

Merson 1968 Food Technology 22:631.
Koseogler 1990 Food Technology Dec. issue, pp. 90–97.

Primary Examiner—Carolyn Paden
Attorney, Agent, or Firm—Edmund M. Jaskiewicz

[57] ABSTRACT

For the production of cloudy juices with stable cloudiness from plant products, the raw juice, is clarified in ultrafiltration unit (2) and is mixed as cold sterilized clear juice with the filter residue of a crossflow filtration. Here the filter residue serving as clouding agent is very finely crushed in crushing unit (1) before being fed into mixing device (4). Along with the filter residue stabilizing agents are also fed into mixing device (4), to prevent the agglomeration of the very finely crushed particles. Through the totality of the measures according to the invention a high degree of cloudiness stability of the cloudy juice is achieved.

24 Claims, 2 Drawing Sheets

PROCESS FOR THE PRODUCTION OF CLOUDY JUICE WHICH IS CLOUDING-STABLE

FIELD OF THE INVENTION

The invention relates to a process for producing cloudy juice with stable cloudiness from plant products for the production of beverages by addition of filter residue, particularly retentate from a crossflow filtration of raw juice extracted from plant products.

As plant raw material for the extraction of these juices fruit, berries, grapes, citrus fruits and vegetables are particularly suitable.

DESCRIPTION OF THE PRIOR ART

The known processes of this kind are mainly used to produce cold sterilized, cloudy juices by membrane filtration. In this case a clear juice necessarily results as an intermediate product. Such processes represent an interesting possibility for utilizing the retentate that results from fruit juice clarification by ultrafiltration or microfiltration. The juice that is to be made cloudy and the retentate that is to be added can, but does not have to, originate from the same product. With citrus fruits, for example, using retentate from membrane filtration as a clouding agent is known.

Further the cold sterilized production of cloudy fruit juice, particularly orange juice is generally known. Here the cold sterilization takes place by ultrafiltration and a possible concentration by reverse osmosis. The retentate (pulp) from the ultrafiltration is pasteurized, for example, and is added to the permeate from the ultrafiltration or to the concentrate from the reverse osmosis.

What is disadvantageous in these known processes is that the retentate added to the clear juice to make it cloudy sediments again relatively quickly. This sedimenting is even observed, when the original juice before the membrane filtration had sufficiently stable cloudiness. This problem is particularly critical in the use of the known processes for fruit juices, since such juices, in contrast to citrus fruit juices, are practically not accepted on the market. The reason for this is that naturally cloudy fruit juices have largely stable cloudiness and the consumer has become accustomed to these juices. In contrast, having to shake citrus fruit juices before use is not offensive.

SUMMARY OF THE INVENTION

The object of the invention is to increase the cloudiness stability of cloudy juice and to prevent the sedimenting of the clouding agents that are added to the juice.

According to the invention, this object is attained by subjecting the filter residue to at least one crushing and by mixing it with at least one stabilizing agent.

Further configurations and advantageous further developments of the process according to the invention can be taken from the claims.

BRIEF DESCRIPTION OF THE DRAWINGS

The invention is explained in greater detail in the description that follows and the diagrammatic drawing that represents two embodiments. There are shown in.

DESCRIPTION OF THE PREFERRED EMBODIMENTS

Figure 1:
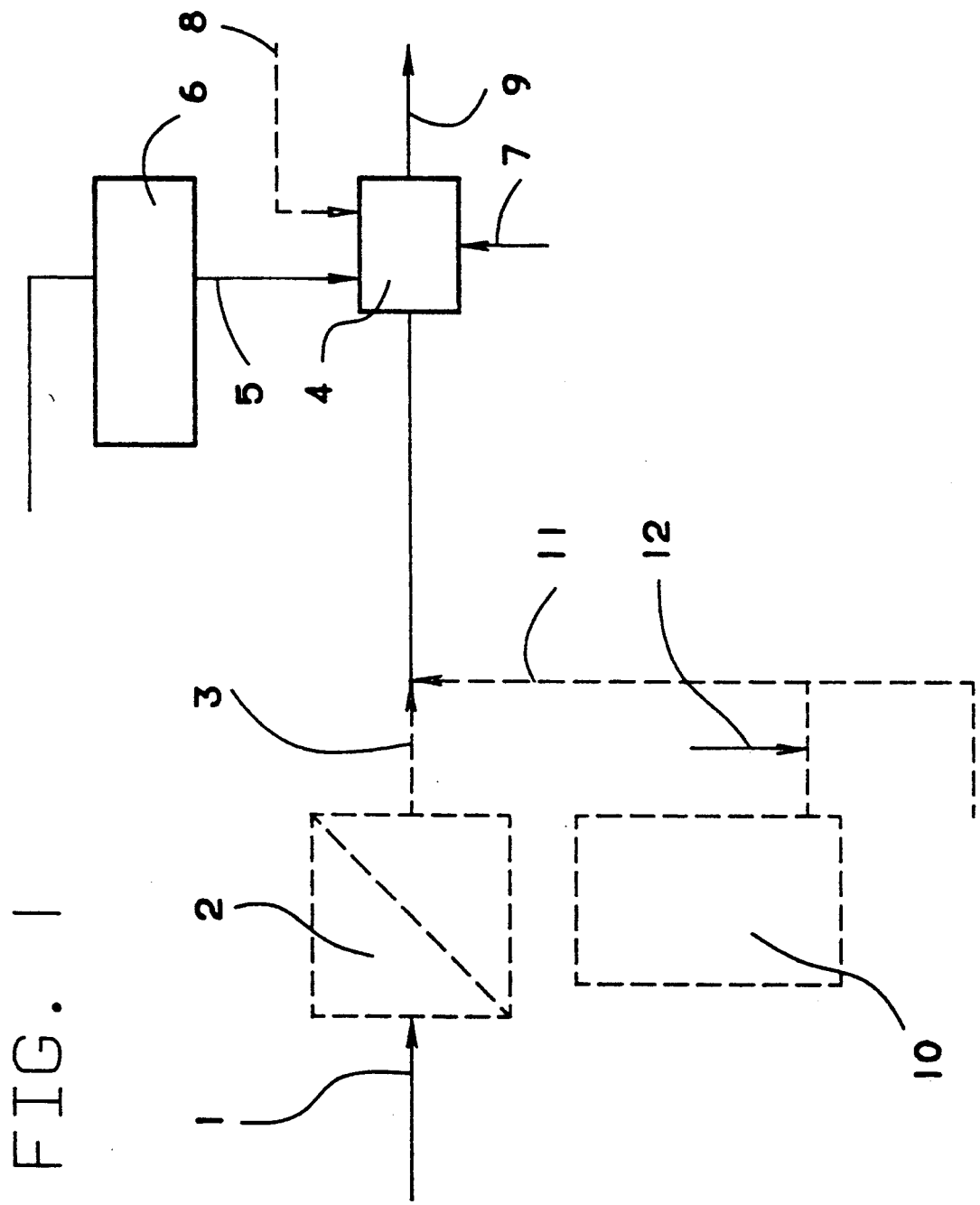
FIG. 1, a diagram of the process according to the invention for the production of cloudy juice with stable cloudiness from clear juice and FIG. 2, another embodiment of the process for the production of cloudy juices with stable cloudiness that are practically cold sterilized.

As FIG. 1 shows, the raw juice extracted from fruit, berries, grapes, citrus fruits or vegetables is fed by pipe 1 to ultrafiltration unit 2. In ultrafiltration unit 2 a cold sterilization of the raw juice takes place. In addition other crossflow membrane processes can be used, however advantageously ultrafiltration or microfiltration with safety microfiltration (filter cartridges connected downstream. Further it is possible to use the process of sterile layer filtration, possibly with safety microfiltration connected downstream for the cold sterilization.

The permeate of ultrafiltration unit 2 is fed as cold sterilized clear juice by pipe 3 into mixing device 4. In mixing device 4, which can consist of a static mixer for example, filter residues, preferably the retentate from ultrafiltration unit 2, are fed into the clear juice by pipe 5, to obtain the desired clouding of the clear juice. Also filter residues from other filtration units can be used. Before the filter residue arrives in mixing device 4, it is crushed very fine in crushing device 6. By very fine crushing is meant a crushing to a particle size like that which is obtained by known processes for wet milling. In crushing device 6 very fine crushing preferably is mainly performed to a particle size of $\leq 75$ $\mu$m. Here the required degree of crushing is also largely dependent on the structure and density of the particles. As means for the very fine crushing preferably wet milling processes are used, as they are used for refining and homogenizing dispersions and producing emulsions. Thus colloid mills, homogenizers, as well as high-pressure homogenizers or microfluidizers, for example, can be used. The crushing can also be supported by a previous enzyme treatment, for example by cellulase enzymes.

Along with the filter residue, also stabilizing agents are fed into mixing device 4 by pipe 7. The purpose of the stabilizing agents is to prevent the agglomeration of the very finely crushed particles.

Without the addition of stabilizing agents the clouding particles sediment again after a relatively short time. The same thing would occur if only stabilizing agents were added to the juice along with the clouding agents without very fine crushing. As stabilizing agents, along with legally approved nonjuice agents, preferably such agents are used which occur in plant products, particularly in the plant raw materials used. An example of this is the use of pectin as a stabilizing agent.

In addition, fibrillar materials can also fed into mixing device 4 by pipe 8 to produce cloudy juices with fibrillar materials. After the mixing process in mixing device 4, cloudy juice with stable cloudiness is drained off as an end product by pipe 9.

In practice, depending on the situation, another sequence of the above steps can also be selected. Thus the very fine crushing is also possible even in the ultrafiltration unit, for example by the installation of appropriate devices in the circulation cycle and, e.g., by carrying out the very fine crushing at the end of the filtration.

Another possible application of the process according to the invention is the clouding of rediluted clear juice concentrates. Instead of the cold sterilized clear juice, clear juice concentrate from concentrate storage 10 as the starting material is fed by pipe 11 into mixing device 4. By pipe 12 water is added to the clear juice concentrate (FIG. 1). This can involve either thermally concentrated cold juice or so-called cold concentrate, which, for example, is cold clarified by ultrafiltration or microfiltration, cold sterilized and for example, by membrane processes, particularly reverse osmosis, is cold concentrated. In the latter case a cloudy juice similar to "press must" can be produced. Preferably here the juice is cold dearomatized before the concentrating or even before the clarifying, for example by membrane processes such as pervaporation or reverse osmosis, and the flavoring material is enriched likewise by membrane processes and then stored separately from the concentrate.

This use, among other things, serves the uniform production and storage of clear juice concentrates during the harvest period and for clouding the juice a needed when it is brought out of storage. Thus faulty planning because of incorrect market forecasts is avoided. This procedure can be particularly worthwhile, when mainly clear juices are demanded for sales and the clarification of the juices takes, place by a continuous or semicontinuous process, for example by ultrafiltration.

Another suitable use is the production of juices with a varying degree of cloudiness in relation to a certain sugar content. Thus it is possible to market cloudy juices with varying cloudiness in a simple manner. This is also true for the production according to the invention of cold sterilized, cloudy juices and the cloudiness content of rediluted clear juice concentrate as well as for further cases.

Through particularly high concentrations of cloudiness socalled diet agents with an increased portion of indigestible roughage can be produced. Such purees are also suitable as food additives, for example, to yoghurt.

Along with clear juice, cloudy juice can also be used as the starting material for the process according to the invention. The reason for this is the production of pulpy juice or puree from juice with a relatively low cloudiness content, for example, fruit juice. Depending on the cloudiness stability of the initial juice here it is indicated to also subject the initial juice to very fine crushing. In certain cases this is possible together with the clouding agent that is also added.

The clouding agent to be added is preferably used in a form dispersed in liquid. This form is particularly well suited for a very fine crushing. Also further treatment steps are thus possible in a simple manner. Alternatively to the liquid form of the clouding agent, dry products can also be used.

Figure 2:
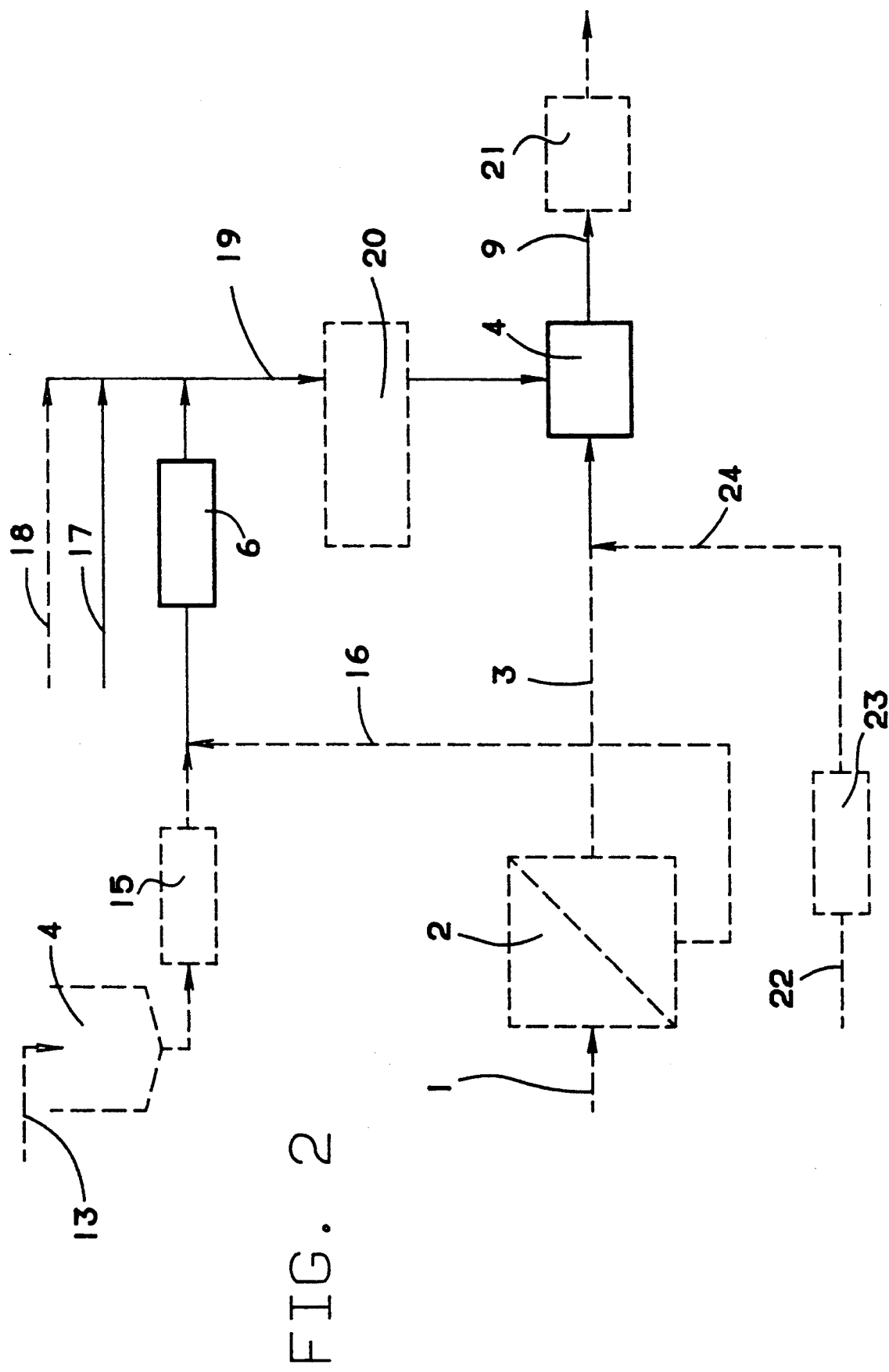

In FIG. 2 an embodiment for the production of practically cold sterilized cloudy juice with stable cloudiness is represented. When crossflow processes are used for the cold sterilization, the retentate from the preceding ultrafiltration unit 2 or another crossflow filtration unit can be used as a clouding agent. The retentate is fed into buffer 14 by pipe 13 and depending on the need is pretreated in a pretreatment step 15. This is done, for example, through purification of undesired materials, such as flavoring materials, possibly alcohol, etc., through bleaching, concentration or sterilization. An appropriate purification is particularly important when the juice and the retentate do not originate from the same plant product. The sequence of the individual treatments is optional and must be adapted to the given situation.

The bleaching, in particular of retentate from the membrane filtration, is generally relatively difficult, since polymer oxidation products are involved. For these reasons relatively high concentrations of bleaching agents or else particular strong bleaching agents must generally be used, which must be removed again practically without a trace or converted into harmless compounds. To improve the efficiency of the bleaching reaction, the bleaching agent is preferably added before and/or during the very fine crushing, which in this case is preferred in the process. The bleaching agents or the conversion products from them are preferably washed by membrane filtration through diafiltration.

As processes for purification, bleaching or concentrating, membrane crossflow processes are particularly suitable, such as, e.g., diafiltration with purification water for the purification of the retentate, possibly connected with a concentration of the dispersion. For the bleaching preferably a diafiltration, e.g., with sulfurized water as the bleaching agent is used and for concentrating, membrane with relatively large pores are used for high flow.

The retentate that has been purified in pretreatment step 15 and bleached is then fed into very fine crushing device 6. Alternatively to the retentate from buffer 14, the retentate of ultrafiltration unit 2 can also be fed by pipe 16 into very fine crushing unit 6. After the very fine crushing the dispersion is stabilized by the addition of stabilizing gents by pipe 17, to prevent any agglomeration. In addition, fibrillar materials are added to the dispersion by another pipe 18.

Before the additives, particularly clouding agents and stabilizing agent, reach mixing device 4, they are combined in pipe 19 and fed into sterilization device 20 upstream from mixing device 4 and are sterilized there. The sterilizing can be done, for example, either individually for each component or jointly for all components in sterilization device 20. The sterilizing can be carried out, for example, with heat, mainly by pasteurization. The impact of the heat is slight, since the dispersion is neutral as to taste and flavoring and represents a relatively small quantitative portion. The sterilization, for qualitative improvement, can take place by a completely cold process, for example with electric shock treatment, ultrasonic treatment methods, UV radiation, silver ion treatment, highpressure treatment, etc. Although these methods are relatively expensive, but because of the concentration of the clouding agents the quantity is relatively small. For reasons of safety a combination of cold sterilization methods is to be preferred.

The fibrillar materials are preferably dispersed before the sterilization into a liquid, for example water, juice or cold sterilized juice. The sterilization can take place in isolation or together with the remaining additives in sterilization unit 20. In the case of fibrillar material the requirement of cloudiness stability can normally be dispensed with. Nevertheless it is desirable that the other clouding components do not sediment.

As in the embodiment according to FIG. 1, in the embodiment according to FIG. 2 the raw juice or redilated cloudy concentrate is fed into cold operated ultrafiltration unit 2 and is fed as cold sterilized clear juice into mixing device 4 by pipe 3 and there it is mixed with the sterilized additives. The juice thus mixed leaves mixing device 4 by pipe 9 as practically cold sterilized cloudy juice with stable cloudiness.

In special cases, for example for long storage periods, storage at elevated temperature etc., the methods of cold sterilization can also be carried out in cold safety sterilization 21 connected downstream from mixing device 4.

On account of the very low bacteria count caused by the pretreatment before the sterilization, the cost for the subsequent cold safety sterilization still remains within economically justifiable limits even for a mass product.

For the production of cold sterilized cloudy juice with stable cloudiness (FIG. 2) even rediluted clear juice concentrate can be used as the starting material. In this case the clear juice concentrate is fed by pipe 22 to at least one sterile microfiltration unit 23, which is designed as a safety filter and fed by pipe 24 directly into mixing device 4.

The retentate from the crossflow filtration unit used in the clouding process according to the invention is a nonfibrillar rather complex product which contains not only cellulose. Along with undesirable materials in the original form, such as for example oxidized polyphenols which cause an undesirable browning of the retentate and which are reduced by bleaching, the retentate also contains valuable proteins.

I claim:

1. A process for production of cloudy juice which is clouding-stable from plant products comprising the steps of subjecting a raw juice extracted from plant products to a crossflow filtration to obtain a resultant juice and a retentate having a filter residue therein, crushing the filter residue, and mixing with the resultant juice the crushed filter residue in an amount sufficient to obtain clouding of the juice and a stabilizing agent to obtain a clouding-stable juice.

2. A process as claimed in claim 1 wherein said crushed filter residue has a particle size such as that obtained by very fine crushing by wet milling.

3. A process as claimed in claim 1 wherein said raw juice comprises one of a clear juice or a cloudy juice.

4. A process as claimed in claim 1 and further comprising the step of subjecting the raw juice to a treatment for crushing residue therein.

5. A process as claimed in claim 1 and further comprising the step of introducing into the raw juice a clouding agent which is capable of being dispersed in a liquid.

6. A process as claimed in claim 1 wherein said crushing produces a particle size of $\leq 75$ $\mu$m.

7. A process as claimed in claim 1 wherein said crushing comprises a wet crushing process.

8. A process as claimed in claim 7 wherein said crushing is carried out by one of colloid mills, homogenizers, high-pressure homogenizers and microfluidizers.

9. A process as claimed in claim 1 wherein said stabilizing agent comprises primarily agents which occur in the plant products from which the raw juice is extracted.

10. A process as claimed in claim 9 wherein said stabilizing agent comprises an agent which occurs in the plant raw materials.

11. A process as claimed in claim 9 wherein said stabilizing agent comprises pectin.

12. A process as claimed in claim 1 and further comprising the steps of collecting the retentate in a buffer, pre-treating the collected retentate by one of bleaching, concentrating or sterilization to purify against undesirable substances.

13. A process as claimed in claim 12 and further comprising the step of introducing a bleaching agent one of before or during the crushing step.

14. A process as claimed in claim 13 and further comprising the step of washing out and separating the bleaching agent by diafiltration.

15. A process as claimed in claim 12 and further comprising the step of using a membrane crossflow filtration process for purification, bleaching and concentrating.

16. In a process as claimed in claim 1 and further comprising the step of introducing a stabilizing agent into the cloudy juice after crushing to stabilize the dispersion thereof.

17. A process as claimed in claim 1 and further comprising the step of subjecting the retentate to cold sterilization.

18. A process as claimed in claim 17 wherein said cold sterilization comprises one of electric shock treatment, ultrasonic treatment, ultraviolet radiation, silver ion treatment or high-pressure treatment.

19. A process as claimed in claim 1 and further comprising the steps of concentrating the resultant juice and storing the concentrated juice, adding water to the concentrated juice to dilute the same such that the juice mixed with the crushed filter residue and a stabilizing agent comprises the diluted juice concentrate.

20. A process as claimed in claim 19 wherein said juice concentrate comprises one or a cold clarified or cold sterilized cold concentrate.

21. A process as claimed in claim 19 and further comprising the step of subjecting the resultant juice to cold dearomatization before concentration thereof, and storing the cold dearomatized juice separately from the juice concentrate.

22. A process as claimed in claim 1 and further comprising the step of varying the cloudiness of the clouding-stable juice with respect to a predetermined sugar content thereof.

23. A process as claimed in claim 1 and further comprising the step of introducing indigestible roughage into the juice to obtain a degree of cloudiness in the clouding-stable juice.

24. A process as claimed in claim 1 and further comprising the step of introducing sterilized fibrillar materials into the resultant juice to produce a cold sterilized cloudy juice.

* * * * *